Aug. 31, 1926.

H. MONTPETIT 1,598,492

VALVE SAFETY DEVICE

Filed Sept. 19, 1925

INVENTOR.
Henri Montpetit

BY Gerald N. Baldwin

ATTORNEY.

Patented Aug. 31, 1926.

1,598,492

UNITED STATES PATENT OFFICE.

HENRI MONTPETIT, OF DETROIT, MICHIGAN.

VALVE SAFETY DEVICE.

Application filed September 19, 1925. Serial No. 57,345.

This invention relates to improvements in valve safety devices, and is more particularly intended for use on valves employed in connection with gas stoves. The usual plug valve is generally equipped with a rotatably movable handle mounted on the end of the valve stem; this handle can be, and often is, turned by objects which accidentally come in contact with it, and again children of tender years often find enjoyment in turning the gas on and off.

It is an object of the present invention to provide a valve safety device in which two movements must be made before it is possible to change the valve position. One movement consists of raising a sleeve arranged round the valve stem and round an extension of the latter, and the second movement consists of turning the extension more or less at right angles to the valve stem to which latter it is pivotally mounted. The extension in its offset position is then ready to be utilized as a handle for turning the valve in the ordinary manner. So that while the necessary movements can be quickly and simply made, the possibility of accidental movement of the valve is eliminated, and at the same time it is practically impossible for quite small children to tamper with the valve setting.

Another object of the invention is to so design the valve safety device that as soon as it is released the extension will spring back into line with the valve stem, and the device will lock automatically.

With these and other objects in view, the invention, which consists in certain novel construction and combination of parts, is hereinafter more fully described with the aid of the accompanying drawings and claimed.

Figure 1:
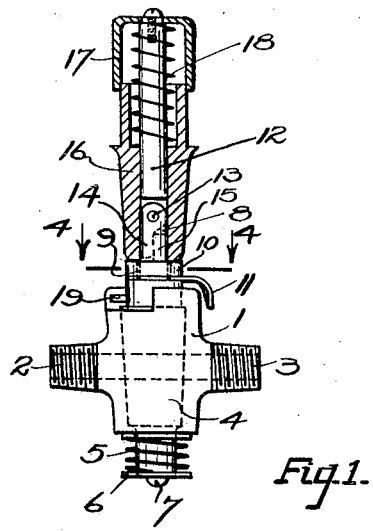
Figure 1 is an elevation of a valve and safety device, the latter part shown in section.
Figure 2:
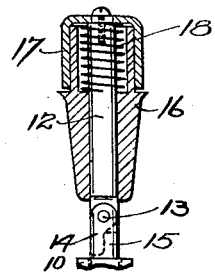
Figure 2 shows the safety device with the spring compressed.
Figure 3:
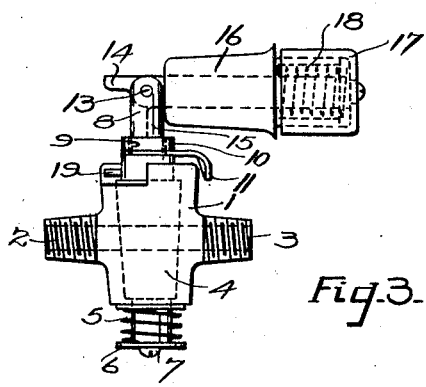
Figure 3 illustrates a valve with the safety device in offset position ready to turn the valve.
Figure 4:
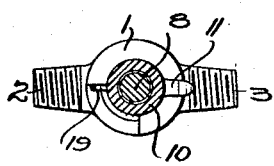
Figure 4 is a section on the line 4—4 of Figure 1.

Referring more particularly to the drawings, 1 designates a valve body having the usual inlet and outlet 2 and 3, and 4 is a plug valve rotatably mounted therein and held in position as by the spring 5, washer 6, and screw 7. 19 is the ordinary stop to limit the turning movement of the valve.

Integral with the valve 4 is a stem 8 threaded at 9 to receive the nut 10 by which the indicator 11 is held in position. The upper end of the valve stem is slotted to receive an extension 12 which is pivotally fastened to the stem by a pin 13. A tongue 14 is provided at the lower end of the extension which is adapted to strike the stop 15 in the slotted portion of the stem so that the extension can only swing in one direction.

Round the valve stem and the extension a sleeve 16 is arranged, and a cap 17 mounted on the upper end of the extension forms a guide to receive the upper end of the sleeve. The upper part of the sleeve is bored out for a helical spring 18 the top of which latter bears against the inner surface of the top of the cap.

The operation of the device is as follows:

When it is desired to move the valve 4, the sleeve 16 is pulled upwards against the spring 18 until it is above the top of the stem 8. The extension 12 is then turned about the pin 13 until it is substantially at right angles to the direction of the stem. When in that position the lower end of the extension reaches right across the slot in the stem so that a turning movement imparted to the extension through the sleeve 16 or cap 17 or both causes the stem 8 and valve 4 to turn.

Meanwhile the action of the spring 18 is such that as soon as the cap or sleeve is released the extension will spring back into locked position as shown in Figure 1, because the more nearly the extension is in line with the valve stem the further the spring can force the sleeve down over the stem. So that not only is it almost impossible to move the setting of the valve when the sleeve and cap are in upright position, but the device also automatically returns to locked position when released.

In the foregoing the preferred embodiment of the invention has been described and shown; it is however understood that the construction is susceptible to such alterations as fall within the scope of the appended claims.

What I claim is:

1. In an article of the character described, the combination of a valve, a valve stem integral therewith, an extension pivotally connected to said valve stem, a sleeve around said extension, spring means adapted to hold the lower end of said sleeve around said valve stem, and a stop limiting the pivotal movement of said extension to one direction only.

2. In an article of the character described, the combination of a valve, a valve stem integral with said valve, an extension pivotally connected to said valve stem, a sleeve round said extension, a cap mounted on the outer end of said extension, said cap forming a guide for the upper end of said sleeve, and spring means adapted to hold the lower end of said sleeve against the top of said valve.

3. In an article of the character described, the combination of a valve, a valve stem integral with said valve, an extension pivotally connected to said valve stem, a sleeve round said extension, a cap mounted on the outer end of said extension and forming a guide for the upper end of the sleeve, and a helical spring seating in an annular groove at the upper end of said sleeve and terminating against the inside of said cap, said spring being adapted to hold the lower end of said sleeve against the top of the valve.

4. In an article of the character described, the combination of a valve, a valve stem integral therewith, an extension pivotally connected to said valve stem, a sleeve normally around said stem and said extension, spring means for tending to hold said sleeve around said stem and against said valve, said sleeve being adapted to be pulled along said extension clear of said valve stem to permit said extension and said sleeve being turned at an angle to the direction of said stem, and said spring means being also adapted to return said extension and sleeve back into line with said stem.

5. In an article of the character described, the combination of a valve, a valve stem integral therewith, an extension pivotally attached to said stem, a sleeve normally around said extenson and said stem, said sleeve having a larger internal bore at its outer end, a helical spring around said extension within said larger bore, one end of said spring bearing against the shoulder formed by the end of said larger bored portion, a member attached to the outer end of said extension forming a stop for the other end of said spring, said sleeve being adapted to move outwards on said extension against the tension of said spring to permit the extension with said sleeve thereon being turned at an angle to said stem, said spring being adapted to return said extension into line with said stem, and a stop for limiting the turning movement of said extension to one direction only.

HENRI MONTPETIT.